United States Patent [19]

Verdegan et al.

[11] Patent Number: 5,462,679
[45] Date of Patent: Oct. 31, 1995

[54] APPARATUS AND METHOD FOR IN SITU CLEANING OF OIL FILTER

[75] Inventors: Barry M. Verdegan, Stoughton; Christopher E. Holm; Stephen L. Fallon, both of Madison; Brian W. Schwandt, Fort Atkinson, all of Wis.

[73] Assignee: Nelson Industries, Inc., Stoughton, Wis.

[21] Appl. No.: 122,382

[22] Filed: Sep. 16, 1993

[51] Int. Cl.$^6$ ................................................. B01D 29/66
[52] U.S. Cl. .......................... 210/798; 210/130; 210/136; 210/411; 210/440; 210/500.1
[58] Field of Search .......................... 210/409–411, 798, 210/440, 443, 444, 130, 136, 508, 509, 500.1

[56] References Cited

U.S. PATENT DOCUMENTS

| | | | |
|---|---|---|---|
| 1,866,970 | 7/1932 | Garland et al. | 210/411 |
| 1,955,903 | 4/1934 | Cammen | 210/411 |
| 2,919,704 | 1/1960 | Butler | 134/102.1 |
| 3,044,475 | 7/1962 | Thompson | 134/102.1 |
| 3,319,794 | 5/1967 | Gross | 210/334 |
| 3,867,294 | 2/1975 | Pall et al. | 210/493.2 |
| 4,322,299 | 3/1982 | Scholten et al. | 210/794 |
| 4,643,836 | 2/1987 | Schmid | 210/795 |
| 4,859,330 | 8/1989 | Pauwels | 210/264 |
| 5,062,398 | 11/1991 | Bedi et al. | 123/196 R |
| 5,160,614 | 11/1992 | Brown | 210/275 |

Primary Examiner—Matthew O. Savage
Attorney, Agent, or Firm—Andrus, Sceales, Starke & Sawall

[57] ABSTRACT

A reusable oil filter adapted to filter oil used in an engine includes a housing operatively connected to the engine, filter media disposed within the housing, a singular backwashing inlet operatively connected on the housing and an oil drain operatively connected with the housing. Pressurized air delivered through the backwashing inlet forces filtered oil to backflow through the filter media displacing contaminated oil from the filter media and creates an air-oil foam for further cleaning the filter media while the housing remains connected to the engine.

10 Claims, 2 Drawing Sheets

APPARATUS AND METHOD FOR IN SITU CLEANING OF OIL FILTER

FIELD OF THE INVENTION

The present invention generally relates to an apparatus and method for cleaning oil filters, and more particularly, pertains to an apparatus and method using pressurized air to clean oil filters at a convenient site relative to the installation of the oil filter on an apparatus such as an internal combustion engine.

BACKGROUND OF THE INVENTION

It is well known that routine oil changes will prolong engine life and performance. With use, motor oil accumulates suspended particles from the atmosphere, from engine parts wearing against one another, and from the products of incomplete combustion. The particles in turn cause abrasive wear of the engine bearings, piston rings, and other moving parts. This adversely affects the engine and, if left uncorrected, can destroy the engine.

To maintain proper engine effectiveness, regular changing of the motor oil in an internal combustion engine is a required task. In currently designed vehicles, the oil pan acts as a reservoir for distribution of engine oil. Engine lubrication is generally provided through a gear-type pump. The pump draws engine oil from the oil pan sump, after which the oil is passed from the pump to the oil filter. The oil filter is generally comprised of pleated synthetic, cellulose paper, fiberglass or other non-woven, synthetic media. In some applications, an oil filter bypass valve is used to ensure adequate oil supply should the filter become blocked or develop excessive pressure drop. In addition, an anti-drainback valve is often provided to prevent backflow of oil. Oil is channeled through the filter to the main valve train components, cam shaft bearings, rocker arms, hydraulic lifters, rod bearings, and other main components of the engine requiring lubrication. A pressure regulator valve, sometimes located in the oil pump, maintains appropriate pressure for the lubrication system and bypasses any excess back to the suction side of the pump. Oil from the pump passes through the filter before going to the main engine parts. In the filter, the oil passes through a filter element where dirt and foreign particles are extracted. To eliminate the used oil, the drain plug, generally located in the lower portion of the oil pan, is opened. The used oil containing suspended particles is allowed to flow by gravity out of the pan into a suitable receptacle. After the used oil is withdrawn, the plug is replaced and fresh oil is added to the engine, usually through a separate aperture in the engine valve cover. As the oil is withdrawn, the oil filter is normally removed, discarded and replaced with a new filter to be used with the fresh oil change. However, the filter and the material of which it is constructed, is capable of a much longer life of service if the filter material can be cleaned of accumulated residue.

One such attempt to clean the oil filter is disclosed in U.S. Pat. No. 2,919,704 issued to Butler on Jan. 5, 1960. In the Butler device, the oil filter is placed in a cleaning compartment and compressed air passing through a venturi is used to draw cleaning fluid into the used filter. The liquid, in combination with the air, cleans the filter. After a sufficient time to clean the filter and the filtering material, a valve is closed to stop the flow of cleaning liquid and compressed air will continue to pass upwardly through the jet nozzle to dispel all liquid from the filter and its filtering material so that the filter may be completely dried before it is removed from its cleaning compartment.

A similar oil filter cleaner is set forth in U.S. Pat. No. 3,044,475 issued to Thompson on Jul. 17, 1962. The Thompson patent provides an external cleaning apparatus wherein a centrally bored head is connected to one end of a conventional tank-type oil filter. Compressed air is introduced such that the directional flow is opposite the normal filtering flow of fluid through the filter. After the majority of the oil contained by the filter is blown out, certain valves are opened and closed to admit cleaning fluid from a reservoir to enter and fill the filter. The filter and head are pivoted to an inverted position and valves are operative to blow the cleaning fluid out of the filter.

In both Butler and Thompson, a separate cleaning liquid or fluid is required to purify the oil filter. In addition, both devices utilize auxiliary components external to the filter for cleaning fluid purposes once the oil filter has been disconnected from its internal combustion engine. It is further clear that in both Thompson and Butler, the function of the compressed air is to dry the filter and to transport the cleaning fluid. Because the normally provided oil inlet and oil outlet are used to introduce and drain air and cleaning fluid in a reversible direction, neither Butler's nor Thompson's device can be used for oil filters having anti-drainback valves.

U.S. Pat. No. 5,051,173 issued to Hoelzel on Sep. 24, 1991, discloses a device to remove oil from an oil filter which has been disconnected from an internal combustion engine. In this device, an external air inlet is used to blow pressurized air through the normal oil outlet of an inverted oil filter such that contaminated oil is exhausted through the normal oil inlet and into a bucket or container for collecting the oil. The purpose of this device is simply to eliminate oil from the oil filter before it is discarded. This apparatus has the same shortcomings as previously discussed in Butler and Thompson, namely, that the oil filter must be removed from its installation and that auxiliary equipment must be used to exhaust oil from the filter. In addition, no consideration is given in Hoelzel for controlling the pressure of the compressed air such that the filter element will not be damaged.

Accordingly, it is especially desirable to provide an in situ, reusable oil filter which is integrally provided with ports which will allow compressed air to enter and contaminated oil to drain from the filter housing. Such filter should be able to be installed directly on an apparatus such as an internal combustion engine without the need for separate adapters or auxiliary components, regardless of the type of filter being used. The cleanable oil filter should contain an appropriately sized channel to restrict the airflow, allowing cleaning of the filter element without damage to it, the filter housing, or the apparatus. It is further desirable that the cleanable oil filter utilize only air and residual oil to clean the filter and eliminate time consuming drying steps used to previously remove oil and cleaning fluid. It is also desirable that the cleanable oil filter utilize only air and residual oil to clean the filter since less waste is generated and needs to be disposed of relative to prior art arrangements requiring a separate cleaning fluid or backwashing only with oil.

SUMMARY OF THE INVENTION

The present invention advantageously provides a cleanable oil filter for effectively loosening and removing substantially all of the residue and oil collected by the filter element whereby the filter element may be repeatedly used.

The improved, cleanable oil filter is relatively simple in structure, easy to use, and has remarkable versatility in various types of disposable oil filters.

These and other advantages are realized in one aspect of the invention by a reusable oil filter adapted to filter oil used in an apparatus. The filter includes a housing which is operatively connected to the apparatus and has an oil inlet for receiving oil to be filtered and an oil outlet for discharging filtered oil to the apparatus. A filter media is disposed in the housing and acts to filter oil from the oil inlet and retain portions of contaminated oil. A singular backwashing inlet is mounted directly on the housing for directing pressurized gas through the filter media. An oil drain is operatively connected with the housing for draining filtered oil from the housing. With this arrangement, pressurized gas forces filtered oil to backflow through the filter media, displacing the contaminated oil from the filter media, and creates a gas-oil foam for further cleaning of the filter media while the housing remains connected to the apparatus.

In a highly preferred embodiment, the invention contemplates a singular backwashing inlet and an oil drain mounted adjacent each other on one end of the housing whereby oil in the housing and pressurized air are combinable to clean the filter for reuse while the housing remains connected to the apparatus.

The invention also envisions a method of cleaning the filter media of an oil filter containing filtered oil and having a housing connected to an apparatus, the method comprising the steps of providing a singular backwashing inlet on the housing, providing an oil drain on the housing, supplying pressurized air through the backwashing inlet to the filter media while the housing remains connected to the apparatus, the pressurized air backwashing the oil from the filter media and creating an air-oil foam for further cleaning the filter media, and draining the filtered oil through the oil drain while the housing remains connected to the apparatus.

BRIEF DESCRIPTION OF THE DRAWINGS

The invention will become better understood by reference to the following detailed description of the preferred exemplary embodiment when read in conjunction with the appended drawings, wherein like numerals denote like elements and.

DETAILED DESCRIPTION OF THE PREFERRED EMBODIMENTS

Figure 1:
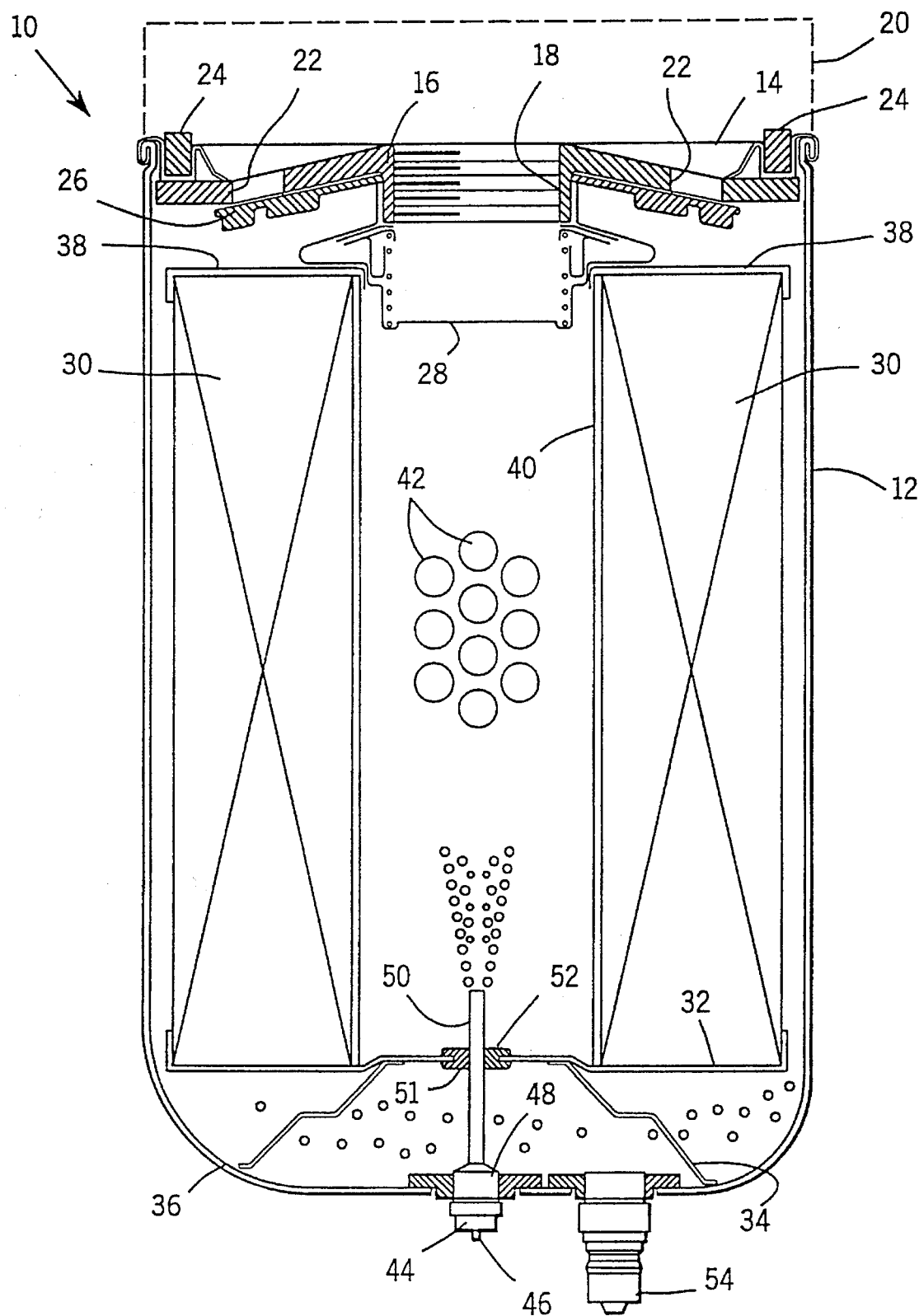
FIG. 1 is a cross sectional view of a reusable oil filter according to the present invention.

Referring now to FIG. 1, the present invention is embodied in a cleanable oil filter 10 generally referred to as a spin on type oil filter. Filter 10 comprises a housing 12 having an upper end portion 14 formed with an internally threaded oil outlet 16. The internal threads of outlet 16 permit filter 10 to be threadingly engaged with a mounting boss 18 normally located on an apparatus such as an engine block 20 of an internal combustion engine used to drive a vehicle. Spaced outwardly from outlet 16 is an oil inlet 22 for recovering oil to be filtered from an oil pump (not shown) and a gasket 24 for sealing end portion 14 against engine block 20. An anti-drainback valve 26 is provided beneath oil inlet 22 for preventing backflow of oil from housing 12. Located directly beneath oil outlet 16 is a bypass valve 28 used to ensure adequate oil supply should filter 10 become plugged.

A porous filter element 30, typically cylindrical in shape and normally comprised of pleated synthetic, cellulose papers, fiberglass or other disposable filter media, is disposed in housing 12 and has a base end cap 32 supported on a spring clip 34, or other suitable retaining device, positioned on a lower end portion 36 of housing 12. The filter media is tubular and has a radially outer inlet side fluidly connected to the inlet 22 and an interior outlet side defining a void space, the void space being fluidly connected to the outlet 16. The upper end of filter element 30 is retained in position by an upper end cap 38 disposed adjacent bypass valve 28. Filter element 30 defines a hollow, foraminous center tube 40 having a plurality of apertures 42 for distributing oil and surrounds the void space.

As a salient feature of the invention, a singular air inlet 44 is formed centrally on the lower end portion 36 of housing 12 and has one end 46 connected to a source of compressed air or other suitable gas during cleaning. Inlet 44 has another end 48 connected to an elongated tube 50 which extends upwardly through a central opening 51 formed in base end cap 32 into center tube 40 and passes through a support grommet 52 mounted in central opening 51. Grommet 52 functions as a sealing means to prevent communication between oil inlet 22 and oil outlet 16. Tube 50 serves as a restrictive channel for directing pressurized air into filter 10 such that filter element 30 and housing 12 will not be damaged or destroyed. Inlet 44 is normally closed during the regular filtering of oil within filter 10.

A further feature of the invention resides in a distinct oil drain 54 which is preferably located laterally adjacent air inlet 44 on the lower end 36 of housing 12, but may be disposed elsewhere on housing 12. Like inlet 44, oil drain 54 is normally closed during the conventional filtering of oil in filter 10.

In use, filter 10 is screw threaded on mounting boss 18 of engine block 20 and oil is pumped through inlet 22 and through filter element 30, normally in an outside to inside flow. Contaminants are filtered out and filtered oil flows out through outlet 16 for lubricating the components of the engine. As captured contaminants build up in filter element 30, the pressure drop across filter 10 increases. At the normal time of an oil change, flow of contaminated oil to filter 10 is ceased and filter 10 is cleaned.

Cleaning is accomplished with filter 10 remaining connected to mounting boss 18 by attaching a compressed air line to inlet 44 and simultaneously opening oil drain 54. Initially compressed air forces clean filtered oil from the downstream side of housing 12 to backflow through filter element 30 so as to displace significant quantities of contaminants from filter element 30. After the majority of the downstream oil has been backflushed through filter element 30, the residual oil and air create an air-oil foam. The bubbles of this foam displace oil and create turbulence inside and outside filter element 30. This scours contaminants from the filter element 30 and fiber surfaces. The foam also acts as a contaminant carrier to assist in the transport of contaminants out of filter element 30. The net result is a cleaned filter 10 with lower pressure drop which may be reused. During the cleaning process, contaminated oil and air is drained out of oil drain 54. Typically, the entire process takes less than three minutes, although the actual time varies as a function of the filter characteristics and cleaning conditions. While the cleaning process occurs, oil in the engine or equipment can be changed in the usual manner. After the compressed air line has been removed, oil drain has been closed, and contaminated oil replaced with fresh oil, housing 12 can be refilled with oil by restarting the oil pump.

It should be appreciated that by using air along with residual oil to clean filter 10, the total volume of cleaning fluid can be increased without increasing the volume of waste oil to be disposed. In addition, the provision of separate air inlet 44 and oil drain 54 integrally found in housing 12 allows efficient cleaning operation without need for special auxiliary adapters used remote from the engine.

Figure 2:
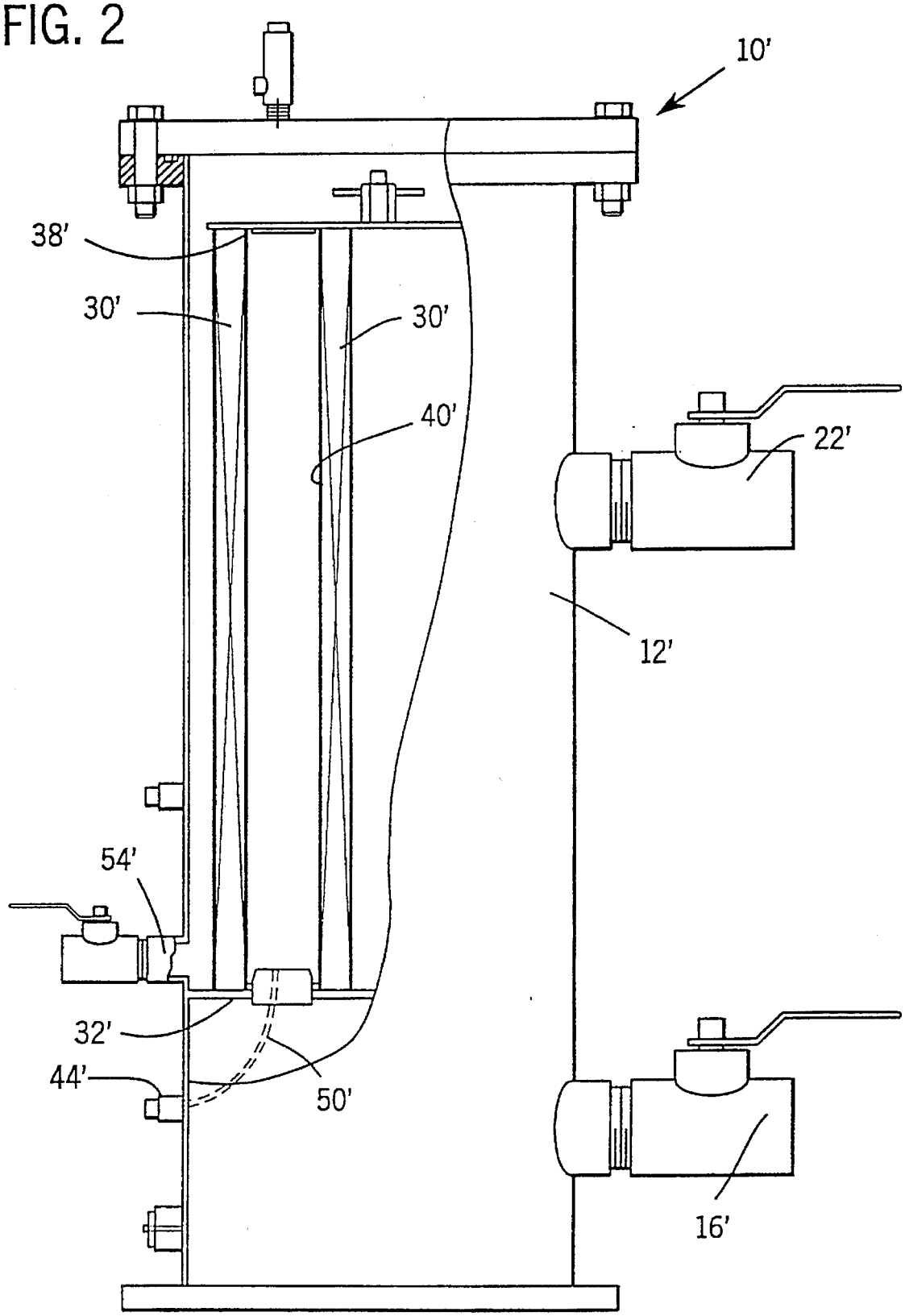
FIG. 2 is a fragmentary, elevational view of an alternative version of a reusable oil filter.

FIG. 2 discloses an alternative cleanable filter 10' generally recognized as a cartridge type oil filter used on large stationary engines. Filter 10' includes a housing 12' operatively connected to an engine by an oil outlet 16' and an oil inlet 22' provided on the side of housing 12'. Filter element 30' is maintained in place between a pair of retaining plates or end caps 32',38' which define a center tube 40' for distributing oil. A separate air inlet 44' joined by a tube 50' to center tube 40', and oil drain 54' are formed on housing 10' and function in the same manner as previously described above to provide an oil filter 10 which is cleanable in situ.

It should be recognized that the present invention markedly enhances the utility of a typical oil filter by the addition of a separate cleaning inlet and drain outlet which permit efficient cleaning of a filter while installed on an apparatus such as an internal combustion engine as well as a hydraulic power transmission or fuel filtration system. Such an arrangement is cost efficient, reduces waste disposal problems and conserves valuable resources. Since air is the only additional cleaning fluid utilized, cleaning is fast and convenient and no additional waste is generated by the cleaning process. In contrast with the prior art filter cleaners, there is no need for time consuming drying steps used to remove oil and cleaning fluid. The use of a restrictive channel for controlling the pressurized air flow increases safety and allows optimization of the cleaning process for a particular filter design where air flow may need to be increased or decreased.

While the invention has been described with reference to a preferred embodiment, those skilled in the art will appreciate that certain substitutions, alternations and omissions may be made without departing from the spirit thereof. For example, while the invention is particularly suitable for use with vehicular mounted and stationary engines, it should be appreciated that the present invention may be utilized with IC engines, hydraulics, fuel handling systems, and other apparatus. Accordingly, the foregoing description is meant to be exemplary only, and should not be claimed limitative on the scope of the invention set forth in the following claims.

We claim:

1. A reusable oil filter adapted to filter oil used in an apparatus, said filter comprising:

a housing for connection to the apparatus, said housing having a top end portion and a bottom end portion, said housing further having an oil inlet at said top end portion for receiving oil to be filtered and an oil outlet at said top end portion for discharging filtered oil to the apparatus;

tubular filter media disposed within said housing, said tubular filter media having a radially outer inlet side fluidly connected to said inlet and an interior outlet side defining a void space, said void space being fluidly connected to said outlet, said filter media retaining portions of contaminated oil;

a singular normally closed backwashing inlet connected on said bottom end portion of housing for introducing pressurized gas below a surface of the filtered oil through said filter media, said backwashing inlet having a restrictive channel means protecting upwardly therefrom, displaced centrally with respect to the bottom of said housing and extending medially of said filter media into said void space for solely controlling said pressurized gas flow into said filter media to prevent damage thereto; and an oil drain located adjacent said inlet side and connected with said bottom end portion of said housing for draining contaminated oil from said housing;

whereby said pressurized gas introduced below the surface of the filtered oil forces filtered oil to backflow through said filter media displacing the contaminated oil from said filter media, and creates a gas-oil foam for further cleaning said filter media while said housing remains connected to the apparatus.

2. The filter as recited in claim 1, wherein said filter media is operatively supported by a retaining means disposed in said housing.

3. The filter as recited in claim 1, wherein said inlet includes an anti-drainback valve.

4. The filter as recited in claim 1, wherein said filter media has a foraminous, center tube therein.

5. The filter as recited in claim 1, wherein said housing includes a bypass valve in communication with said inlet and said oil outlet.

6. The filter as recited in claim 1, including a base end cap for supporting a bottom end of said filter media, said base end cap having a central opening formed therein for introduction of the pressurized gas and sealing means disposed in said central opening for preventing communication between said oil inlet and said oil outlet.

7. The filter as recited in claim 1, wherein said filter media is comprised of cellulose paper.

8. The filter as recited in claim 1, wherein said filter media is comprised of synthetic, non-woven material.

9. The filter as recited in claim 1, wherein said filter media is comprised of fiberglass.

10. A method of cleaning the filter media of an oil filter containing filtered oil and having a housing connected to an apparatus, said method comprising the steps of:

providing an oil filter and apparatus according to claim 1;

supplying pressurized air through said backwashing inlet to the outlet side of the filter media while said housing remains connected to the apparatus, the pressurized air backwashing the oil from said filter media and creating an air-oil foam for further cleaning said filter media; and draining the filtered oil through said oil drain while said housing remains connected to the apparatus.

\* \* \* \* \*

UNITED STATES PATENT AND TRADEMARK OFFICE
CERTIFICATE OF CORRECTION

PATENT NO. : 5,462,679
DATED : October 31, 1995
INVENTOR(S) : Verdegan, et al

It is certified that error appears in the above-indentified patent and that said Letters Patent is hereby corrected as shown below:

CLAIM 1, Col. 6, Line 8, delete "protecting" and substitute therefor ---projecting---; CLAIM 2, Col. 6, Line 25, delete "operatively".

Signed and Sealed this

Sixteenth Day of January, 1996

Attest:

BRUCE LEHMAN

Attesting Officer

Commissioner of Patents and Trademarks